Aug. 21, 1956  R. B. COTTRELL  2,759,567
TREAD BRAKE ARRANGEMENT FOR SIX-WHEEL TRUCK
Filed July 19, 1952  3 Sheets-Sheet 1

INVENTOR.
Robert B. Cottrell
BY
Orrin O. B. Garner
Atty

Aug. 21, 1956   R. B. COTTRELL   2,759,567
TREAD BRAKE ARRANGEMENT FOR SIX-WHEEL TRUCK
Filed July 19, 1952   3 Sheets-Sheet 2

INVENTOR.
Robert B. Cottrell
BY
Orvin O. B. Garner
Atty.

Aug. 21, 1956  R. B. COTTRELL  2,759,567
TREAD BRAKE ARRANGEMENT FOR SIX-WHEEL TRUCK
Filed July 19, 1952  3 Sheets-Sheet 3

INVENTOR.
Robert B. Cottrell
BY
Orrin O. B. Garner
Atty.

United States Patent Office 2,759,567
Patented Aug. 21, 1956

2,759,567

TREAD BRAKE ARRANGEMENT FOR SIX-WHEEL TRUCK

Robert B. Cottrell, Chicago, Ill., assignor to American Steel Foundries, Chicago, Ill., a corporation of New Jersey Application July 19, 1952, Serial No. 299,853

3 Claims. (Cl. 188—33)

This invention relates to railway brake equipment and more particularly to a combination wheel and off-wheel brake arrangement for a six wheel truck.

The present invention contemplates the provision of a combination wheel and off-wheel brake arrangement on each side of a six wheel truck, each brake arrangement having power cylinders associated therewith for effecting proper brake application.

This invention further contemplates the provision of a brake arrangement in which brake shoes are provided to frictionally engage the peripheries of the wheels, and off-wheel brake shoes are provided to frictionally engage rotors rotatable with the wheels and preferably secured thereto.

This invention further contemplates the provision of a combination wheel and off-wheel brake arrangement for one side of a six wheel truck in which a clasp brake is provided to engage the middle wheel and rotors are secured to the end wheels for frictional engagement between stators disposed between the middle axle and the axles of their associated wheels.

This invention further contemplates the provision of a brake arrangement in which a middle wheel is engaged between two brake shoes, and the adjacent side wheels are each engaged by a single brake shoe, and several shoes being interconnected for movement simultaneously responsive to operation of a single power cylinder.

This invention embodies other novel features, details of construction and arrangement of parts which are hereinafter set forth in the specification and claims and illustrated in the accompanying drawings, wherein:

Figure 1:
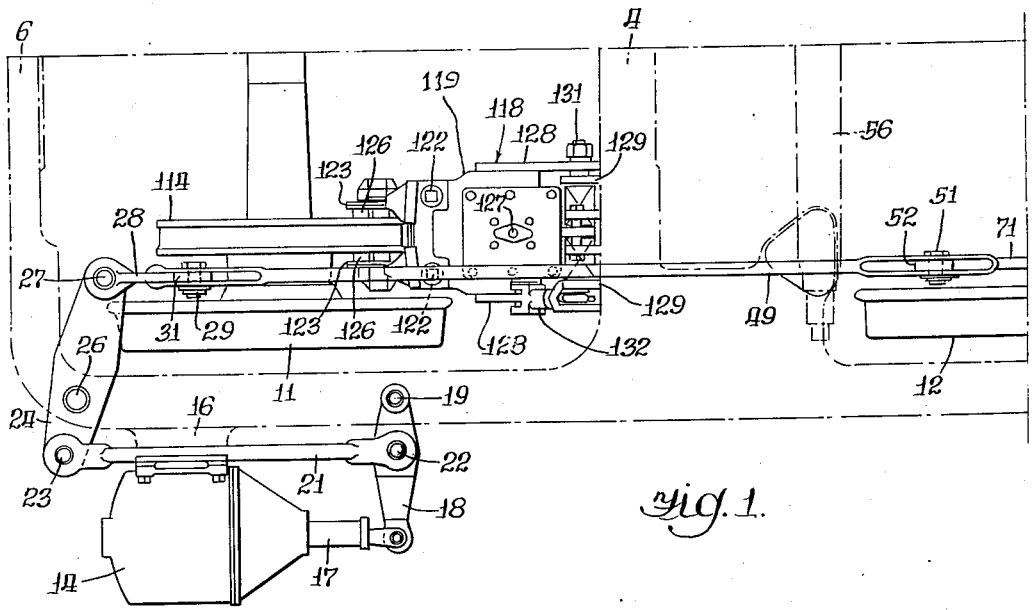
Figures 1 and 1A are top plan views at opposite sides respectively of the transverse center line of a truck structure embodying the invention, only one-half of the structure being shown as it is symmetrical about its longitudinal center line.
Figure 2:
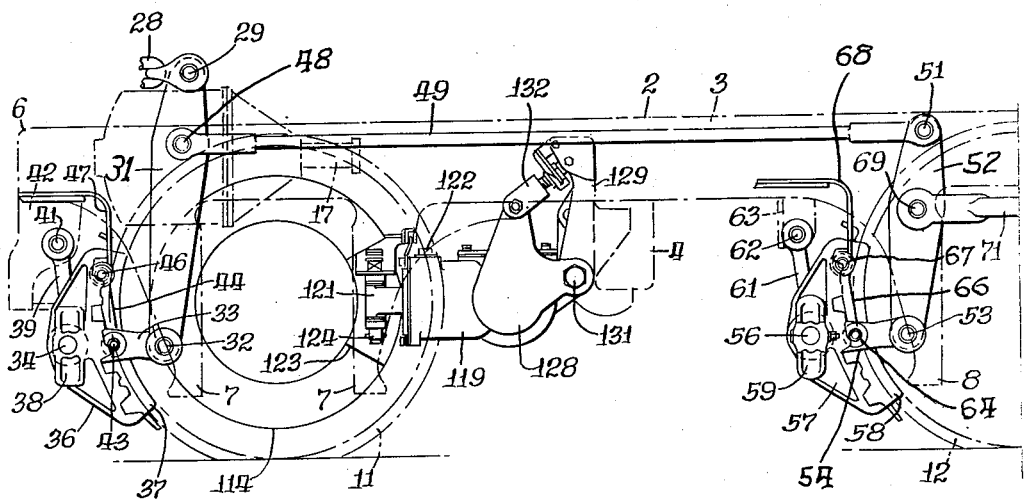
Figures 2 and 2A are side elevational views of the truck structure illustrated in Figures 1 and 1A.
Figure 1A:
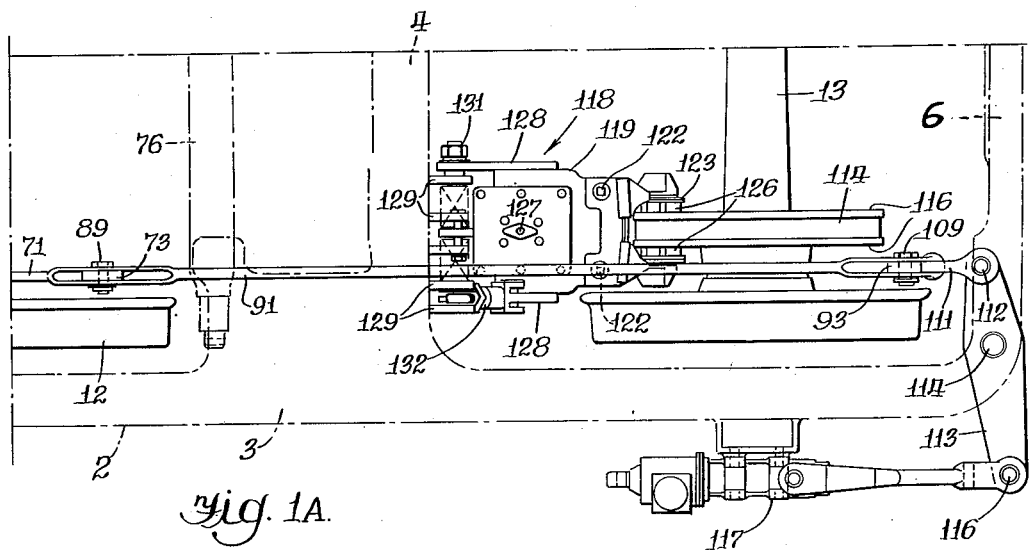
Figure 2A:
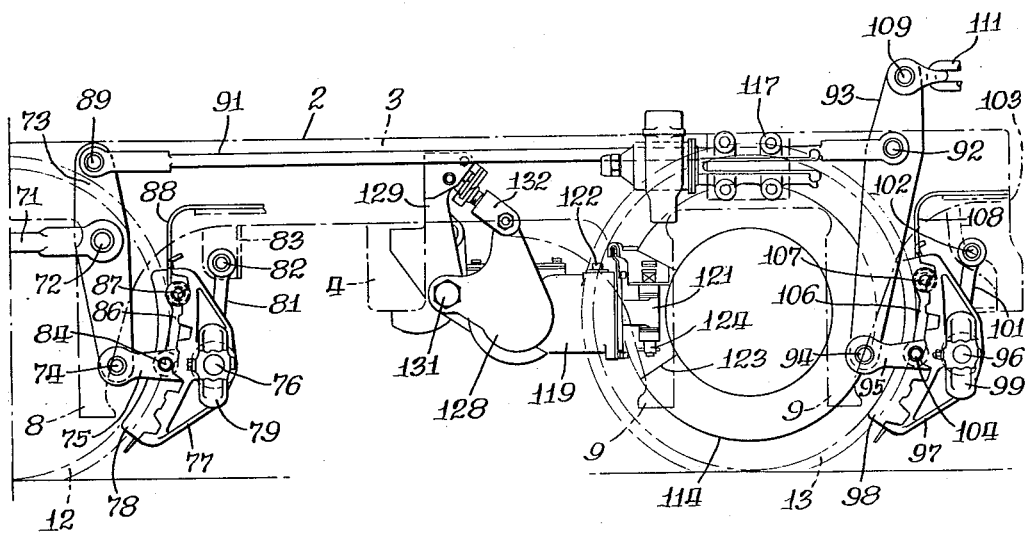

Referring now to the drawings for a better understanding of this invention and more particularly to Figures 1-1A and 2-2A therein, a six wheel truck structure is shown as comprising a truck frame 2 comprising spaced side rails or side frames 3—3 joined together by spaced transoms 4—4 and end rails 6—6, each side frame having three sets of pedestals 7—7, 8—8, and 9—9 for association with journal box means (not shown) serving as the usual means of connection to the journal portions of wheel and axle assemblies 11, 12 and 13.

As similar brake riggings are provided on opposite sides of the truck frame, only one side of the truck frame and its associated brake rigging is herein shown and described to avoid repetition. Each brake rigging is entirely supported on the truck frame 2 and is shown as comprising a tread brake arrangement including a power cylinder 14 bolted to a bracket 16 provided on one end of the side frame 3, the cylinder housing a piston having a rod 17 pivotally connected to one end of a cylinder lever 18 having its other end pivotally mounted at 19 on the side frame.

A pull rod 21 is pivotally connected at 22 to the cylinder lever 18 and at 23 to the outboard end of a dead auxiliary lever 24 which is mounted for pivotal movement at 26 on the truck frame. The inboard end of the auxiliary lever 24 is pivotally connected at 27 to clevis means 28 which is pivotally connected at 27 to the upper end of a live brake lever 31 disposed adjacent one side of the wheel and axle assembly 11 and pivotally connected at 32 to a fulcrum 33 connected to a brake beam 34. The brake beam 34 comprises a trunnion end supporting a brake head 36 carrying a brake shoe 37 for braking engagement with the tread of the adjacent wheel of the assembly 11, the brake head being provided with a conventional brake head balancing device 38. The trunnion end of the brake beam 34 is also pivoted to the lower end of a brake hanger 39 which is pivotally connected at its upper end at 41 on a hanger bracket 42 secured to the end rail 6. The beam 34 is also fulcrumed at 43 to the lower end of a balance hanger 44 pivoted at its upper end at 46 on a bracket 47 secured on the end rail 6.

The live truck lever 31 is pivoted intermediate its ends at 48 to one end of a pull rod 49 which passes over the axle of the assembly 11 for pivotal connection at its other end at 51 to the upper end of a live brake lever 52 disposed adjacent one side of the intermediate wheel and axle assembly 12. The lower end of the brake lever 52 is pivotally connected at 53 to a fulcrum 54 connected to an intermediate brake beam 56. The brake beam comprises a trunnion end supporting a brake head 57 carrying a brake shoe 58 for braking engagement with the tread of the adjacent wheel of the assembly 12, the brake head being provided with a conventional brake head balancing device 59. The trunnion end of the brake beam 56 is also pivoted to the lower end of a brake hanger 61 having its upper end pivotally connected at 62 to a lug or bracket 63 provided on the truck frame. The brake beam 56 is also fulcrumed at 64 to the lower end of a balance hanger 66 having its upper end pivotally connected at 67 on a bracket 68 secured on the truck frame.

The live brake lever 52 is pivoted intermediate its ends at 69 to one end of a pull rod 71 which passes over the axle of the adjacent assembly 12 and has its other end pivotally connected at 72 to a live brake lever 73 intermediate the ends thereof. The lower end of the live brake lever 73 is pivoted at 74 to a fulcrum 75 on a brake beam 76 having a trunnion end pivotally supporting a brake head 77 having a shoe 78 thereon for braking engagement with the tread of the adjacent wheel of the assembly 12, the brake head being provided with a conventional brake head balancing device 79. The trunnion end of the brake beam 76 is also pivoted to the lower end of a brake hanger 81 having its upper end pivotally connected at 82 to a lug or bracket 83 provided on the truck frame. The brake beam 76 is also fulcrumed at 84 to the lower end of a balance hanger 86 having its upper end pivotally connected at 87 on a bracket 88 secured on the truck frame.

The upper end of the live brake lever 73 is pivotally connected at 89 to one end of a pull rod 91 which passes over the axle of the assembly 13 and has its other end pivotally connected at 92 to a live brake lever 93 intermediate the ends of the latter. The lower end of the brake lever 93 is pivoted at 94 to a fulcrum 95 on a brake beam 96 having a trunnion end pivotally supporting a brake head 97 having a shoe 98 thereon for breaking engagement with the tread of the adjacent wheel of the assembly 13. The brake head 97 is provided with a conventional brake head balancing device 99. The trunnion end of the brake beam 96 is also pivoted to the lower end of a brake hanger 101 having its upper end pivotally connected at 102 to a hanger bracket 103 secured on the end rail 6 of the truck frame. The brake beam 96 is also fulcrumed at 104 to the lower end of a balance hanger 106 having its upper end pivotally connected at 107 on a bracket 108 secured on the truck frame.

The upper end of the brake lever 93 is pivotally connected at 109 to a clevis means 111 which is pivotally connected at 112 to the inboard end of slack adjuster lever 113 which is mounted for pivotal movement at 114 on the truck frame. The outboard end of the lever 113 is pivotally connected at 116 to a conventional automatic slack adjuster 117 bolted to the side frame 3.

Similar off-wheel brake arrangements are associated with each wheel of the wheel and axle assemblies 11 and 13 and are generally of the type disclosed in a copending application Ser. No. 215,892, filed March 16, 1951, by Tack et al., now Patent No. 2,655,226, Each off-wheel brake arrangement is shown as comprising a friction disk or rotor 114 bolted to its associated wheel for common rotational movement therewith the rotor having friction faces 116—116 on opposite sides thereof.

A brake frame, indicated generally at 118, is shown as comprising a housing 119 having a pair of brake levers 121—121 pivotally mounted thereon at 122—122 and projecting outwardly from the housing along opposite sides of the rotor 114. Brake heads 123—123 are pivotally mounted on the outer ends of their respective levers 121—121 by means of bolts 124—124, each brake head having a brake shoe 126 secured thereon for braking engagement with its related friction face 116. The inner ends of the brake levers 121—121 are engaged and actuated by a conventional brake cylinder (not shown) enclosed within the housing 119 and connected at 127 to a suitable fluid supply line (not shown), which may also lead to the power cylinder 14, to thus actuate the tread brakes and off-wheel brakes simultaneously responsive to operation of a conventional brake control arrangement.

A pair of arms 128—128 are secured on the housing 119 for pivotal engagement with brackets 129 secured to the adjacent transom 4, the arms and brackets being formed with registering apertures to receive a pivot bolt 131. To secure the housing in a fixed adjusted position, a connecting means 132 is pivotally connected at one of its ends to an arm 128 and at its other end to a bracket 129, as disclosed in the aforesaid pending application.

In the operation of the brake arrangement thus described, fluid under pressure is directed into the power cylinder 14 to move the rod 17 outwardly therefrom and pivot the lever 18 in a counterclockwise direction. The lever 18 acts through the pull rod 21 to pivot the auxiliary lever 24 in a counterclockwise direction to cause the brake lever 31 to pivot about its fulcrum 48 in a counterclockwise direction to move the brake shoe 37 into braking engagement with the tread of the adjacent wheel of the assembly 11. Simultaneously, the brake lever 31 moves the pull rod 49 to the left (Figure 2) causing the brake lever 52 to pivot about its fulcrum 69 to move the brake shoe 58 against the periphery of the adjacent wheel of the assembly 12. Movement of the brake lever 52 to the left acts through the pull rod 71 to pivot the brake lever 73 about its fulcrum 72 to move the brake shoe 78 against the wheel of the assembly 12. As the lever 73 is moved to the left, it acts through the pull rod 91 to draw the brake lever 93 to the left and to pivot the latter about its fulcrum 92 to apply the brake shoe 98 to the periphery of the adjacent wheel of the assembly 13. Release of the power means will cause reversal of the movement heretofore described in applying the brakes. As heretofore pointed out, duplicate tread brake arrangements are provided on opposite sides of the track for simultaneous operation. In operation of the off-wheel brake arrangement, the levers 121—121 move their respective brake shoes 126—126 into and out of frictional engagement with the friction faces 116—116 of their related rotors to coact with the tread brake arrangement in decelerating a truck.

Figure 3:
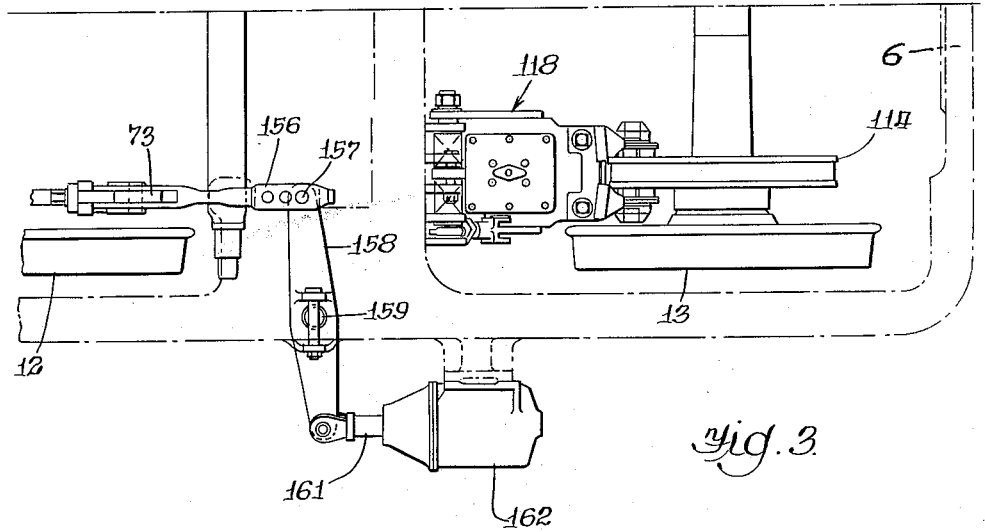
Figure 3 is a fragmentary top plan view illustrating a modified form of the invention in which a clasp brake arrangement is provided for each middle wheel, each end wheel being provided with a rotor brake means of the type heretofore shown in Figures 1-1A and 2-2A.
Figure 4:
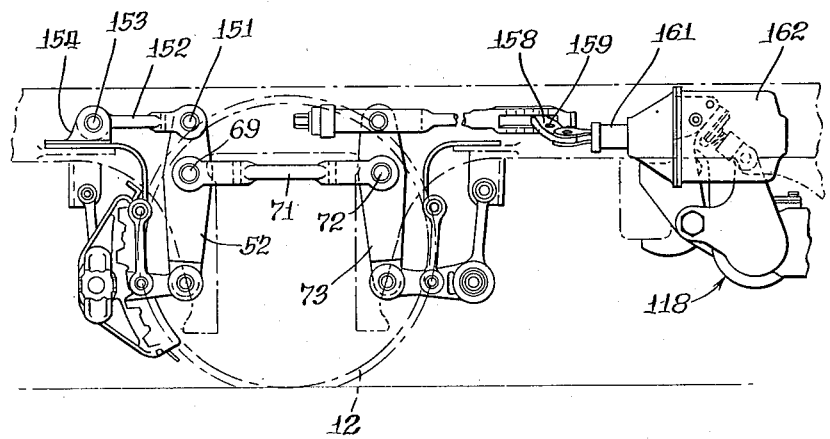
Figure 4 is a fragmentary side elevational view of same.

Figures 3 and 4 in the drawings illustrate a modified form of this invention in which the central wheel and axle assembly 12 only is engaged by a tread brake arrangement, and the end wheel and axle assemblies 11 and 13 are provided with off-wheel brake arrangements only. In this form of the invention the upper end of the live brake lever 52 is pivotally connected at 151 to one end of an anchor rod 152 having its other end pivotally connected at 153 to a bracket 154 secured to the truck frame. The upper end of the live brake lever 73 is pivotally connected to a slack adjuster 156 which is also pivotally connected at 157 to the inboard end of a cylinder lever 158. The lever 158 is pivotally mounted at 159 on the truck frame and has its outer end pivotally connected to a piston rod 161 of a power cylinder 162 secured on the truck frame. This form of the invention is otherwise similar to the form heretofore shown and described.

While this invention has been shown in but one form it is obvious to those skilled in the art that it is not so limited but is susceptible of various changes and modifications without departing from the spirit and scope of the claimed invention.

I claim:

1. In a brake arrangement for a six wheel railway car truck, a truck frame, three spaced supporting wheel and axle assemblies, two of said assemblies arranged adjacent the respective ends of the truck frame and the other of said assemblies arranged centrally of the truck frame similar tread brake arrangements mounted on opposite sides of said truck frame, each tread brake arrangement comprising a pair of live brake levers disposed on opposite sides of the assembly arranged centrally of the truck frame, live brake levers of greater length than said first-mentioned brake levers disposed on remote sides of the assemblies arranged adjacent the ends of the truck frame, a brake beam connected to each brake lever, said brake beam supporting brake shoes for engagement with related wheels, rods directly interconnecting the brake levers, and actuating means to move said brake levers to engage the brake shoes against their related wheels, each rod being pivotally connected at its ends to adjacent brake levers, the brake levers associated with the central wheel and axle assembly being connected intermediate their ends by one of said rods passing over said assembly, said one rod having its opposite ends directly pivoted to said central brake levers, the brake levers associated with said end assemblies being coaxial and each being directly pivotally connected intermediate its ends to one end of another of said rods which in turn has its opposite end directly pivotally connected to the upper end of the adjacent centrally disposed brake lever.

2. In a brake arrangement for a six wheel railway car truck, a truck frame, three spaced supporting wheel and axle assemblies, two of said assemblies arranged adjacent the respective ends of the truck frame and the other of said assemblies arranged centrally of the truck frame similar tread brake arrangements mounted on opposite sides of said truck frame, each tread brake arrangement comprising a pair of live brake levers disposed on opposite sides of the assembly arranged centrally of the truck frame, live brake levers of greater length than said first-mentioned brake levers disposed on remote sides of the assemblies arranged adjacent the ends of the truck frame, a brake beam connected to each brake lever, said brake beam supporting brake shoes for engagement with related wheels, rods interconnecting the brake levers, and actuating means to move said brake levers to engage the brake shoes against their related wheels, each rod being pivotally and directly connected at its ends to adjacent brake levers, the brake levers associated with the central wheel and axle assembly being pivotally connected intermediate their ends by one of said rods passing over said assembly, the brake levers associated with said end assemblies being coaxial and each being pivotally connected intermediate its ends to one end of another of said rods which has its other end directly pivotally connected to the upper end of the adjacent centrally disposed brake lever, said actuating means comprising a power cylinder on said truck frame and including a piston rod, a cylinder lever pivotally mounted on said truck frame and pivotally connected to said piston rod, an auxiliary lever pivotally mounted on said truck frame, a pull rod interconnecting said cylinder lever and auxiliary lever, and a clevis means interconnecting said auxiliary lever and adjacent brake lever.

3. In a brake arrangement for a six wheel railway car truck, a truck frame, three spaced supporting wheel and axle assemblies, two of said assemblies arranged adjacent the respective ends of the truck frame and the other of said assemblies arranged centrally of the truck frame similar tread brake arrangements mounted on opposite sides of said truck frame, each tread brake arrangement comprising a pair of live brake levers disposed on opposite sides of the assembly arranged centrally of the truck frame, live brake levers of greater length than said first-mentioned brake levers disposed on remote sides of the assemblies arranged adjacent the ends of the truck frame, a brake beam connected to each brake lever, said brake beam supporting brake shoes for engagement with related wheels, rods interconnecting the brake levers, and actuating means to move said brake levers to engage the brake shoes against their related wheels, each rod being pivotally and directly connected at its ends to adjacent brake levers, the brake levers associated with the central wheel and axle assembly being pivotally connected intermediate their ends by one of said rods passing over said assembly, the brake levers associated with said end assemblies being coaxial and each being pivotally connected intermediate its ends to one end of another of said rods which has its other end directly pivotally connected to the upper end of the adjacent centrally disposed brake lever, said actuating means comprising a power cylinder on said truck frame and including a piston rod, a cylinder lever pivotally mounted on said truck frame and pivotally connected to said piston rod, an auxiliary lever pivotally mounted on said truck frame, a pull rod interconnecting said cylinder lever and auxiliary lever, and a clevis means interconnecting said auxiliary lever and adjacent brake lever, and means including a slack adjuster supported on the truck frame to resist movement of said brake levers and their interconnecting rods in a direction longitudinally of the truck frame responsive to operation of said power cylinder to engage the brake shoes to their related assemblies.

References Cited in the file of this patent

UNITED STATES PATENTS

| | | |
|---|---|---|
| 1,787,563 | Baselt | Jan. 6, 1931 |
| 1,947,675 | Schwentler | Feb. 20, 1934 |
| 2,133,243 | Baselt | Oct. 11, 1938 |
| 2,149,496 | Baselt | Mar. 7, 1939 |
| 2,352,222 | Pogue et al. | June 27, 1944 |
| 2,359,806 | Tack | Oct 10, 1944 |
| 2,418,057 | Tack et al. | Mar. 25, 1947 |
| 2,423,055 | Tarbox | June 24, 1947 |
| 2,627,944 | Simanek | Feb. 10, 1953 |